United States Patent [19]

Farmer

[11] Patent Number: 4,903,927
[45] Date of Patent: Feb. 27, 1990

[54] ELECTRICAL EQUIPMENT CLUSTER MOUNT

[75] Inventor: Marion R. Farmer, Shelby, Tenn.
[73] Assignee: Aluma-Form, Inc., Memphis, Tenn.
[21] Appl. No.: 393,124
[22] Filed: Aug. 14, 1989

Related U.S. Application Data

[63] Continuation-in-part of Ser. No. 251,125, Sep. 29, 1988.
[51] Int. Cl.$^4$ .............................................. E04G 3/00
[52] U.S. Cl. ................... 248/219.4; 211/107
[58] Field of Search ............... 248/219.4, 218.4, 219.3, 248/172; 52/697, 40; 211/107, 26

[56] References Cited

U.S. PATENT DOCUMENTS

| | | | |
|---|---|---|---|
| 2,708,087 | 5/1955 | Blackstone | 248/219.4 X |
| 2,879,964 | 3/1959 | Anderson et al. | 211/107 |
| 2,990,151 | 6/1961 | Phillips | 248/219.3 X |
| 3,374,978 | 3/1968 | Salmon et al. | 211/107 |
| 3,653,622 | 4/1972 | Farmer | 211/107 |
| 3,734,438 | 5/1973 | Kautz | 211/107 |
| 3,750,992 | 8/1973 | Johnson | 248/219.4 X |
| 3,856,250 | 12/1974 | Farmer | 248/219.4 X |
| 4,103,853 | 8/1978 | Bannan | 211/107 X |
| 4,296,904 | 10/1981 | Farmer | 248/2118.4 |
| 4,730,803 | 3/1988 | Hillstrom | 248/219.4 |

Primary Examiner—J. Franklin Foss
Attorney, Agent, or Firm—Paul M. Denk

[57] ABSTRACT

An improved electrical equipment cluster mount for use upon a utility pole or the like is disclosed. The improved electrical equipment cluster mount includes an elongated bearing plate adapted to be mounted to the utility pole and having one or a pair of spaced and elongated polygonally configured structural members each having a plurality of elongated sides and open ends, said members capable of being solid or hollow, and with each hollow structural member being attached to the elongated bearing plate along one side thereof. A plurality of individual brackets extend from other sides of each hollow structural member in predetermined spaced relationship to one another along the elongated sides and are also structurally interlocked with at least one other adjacent bracket on the hollow structural member for mounting electrical equipment, such as transformers, in a predetermined clustered array relative to the utility pole. Each of the individiual brackets include supporting bases which include complementary interfitting and overlapping sections, relative to the supporting base of an adjacent bracket, to structurally interlock and support the individual brackets in a stable and secure position on each of the hollow structural members. The individual brackets may be inclined downwardly or upwardly relative to aligned and cooperating brackets associated with a second spaced hollow structural member, with the hollow structural members also being moved toward and away from one another on the elongated bearing plate to facilitate mounting of the electrical equipment thereto at different spaced locations.

13 Claims, 2 Drawing Sheets

ELECTRICAL EQUIPMENT CLUSTER MOUNT

CROSS REFERENCE TO RELATED PATENT APPLICATION

This application is a continuation-in-part of the patent application having Ser. No. 07/251,125 filed on Sept. 29, 1988, entitled "ELECTRICAL EQUIPMENT CLUSTER MOUNT".

The present invention relates to improved electrical equipment cluster mounts, and more particularly, to wing-typed cluster mounts facilitating mounting of spaced electrical equipment apparatus such as transformers or the like thereto.

In the electrical equipment industry, it is no longer common to mount a single transformer or the like to a utility pole such as shown in prior art U.S. Pat. Nos. 2,879,694, or 2,990,151. The current industry practice, as shown for example, in U.S. Pat. Nos. 3,374,978; 3,653,622; 3,856,250 and 4,296,940, is to mount a series of transformers upon an aluminum or other structural electrical cluster mount. This change in practice occurred when it was discovered that interlocking lightweight aluminum components could be constructed in an electrical equipment cluster mount providing added strength in a light-weight structure, and thereby achieve an overall strong and light-weight construction, which would be easy of assembly and installation.

In our aforementioned co-pending patent application, we have disclosed and claimed an electrical equipment cluster mount which provides improved flexibility and versatility in mounting electrical equipment to a utility pole, without sacrificing strength and durability. In addition, we have shown how it is possible to mount electrical equipment on different combinations of spacings, or to mount electrical equipment in a predetermined clustered array around the utility pole or all on one side of the utility pole, as required by certain states. Finally, our wing-type electrical equipment cluster mount can be constructed to provide interlocking and inter-engaging components that provided enhanced strength to weight ratio structural support for heavy electrical equipment devices such transformers, in order to facilitate mounting same on a utility pole or the like.

It was discovered that some of the structural features and components, incorporated in the design disclosed in our aforementioned patent application, sometimes created a bending moment problem, in that there was a structural failure of certain of the components, thereby weakening the entire cluster mount, particularly when heavier equipment was mounted, and also creating the potential for disassembly or dislodgement of one or more transformers from the electrical equipment cluster mount. Because the electrical equipment cluster mounts must operate over a sustained period in all kinds of weather conditions, structural failure resulting in weakening of the electrical equipment cluster mount is not acceptable.

Therefore, it was apparent that while many of the structural features incorporated in the electrical equipment cluster mount of our aforementioned patent application met or exceeded requirements in many cases, the potential for structural failure, as a result of a bending moment concerns, make it desirable that certain structural design changes be provided for.

SUMMARY OF THE INVENTION

Among the several objects and advantage of the present invention include:

the provision of an improved electrical equipment cluster mount which contains all of the advantages and features of our prior co-pending patent application, but without any structural or design disadvantages as discussed above;

the provision of the aforementioned improved electrical equipment cluster mount that provides interlocking and interengaging components that provide enhanced strength and durability, thereby adding to the environmental endurance of such units, in order to withstand the forces of nature;

the provision of the aforementioned improved electrical equipment cluster mount which withstands excessive loading forces that could create bending moment problems, thereby overcoming the potential deficiencies possibly associated in prior art and our own systems;

the provision of the aforementioned improved electrical equipment cluster mount which provides for the mounting of electrical equipment such as transformers on different spacings, while also affording mounting of the electrical equipment in a circumferentially disposed array around a utility pole or all on one side of the utility pole, as may be desired; and the provision of the aforementioned improved electrical equipment cluster mount which can be economically and efficiently constructed as extruded aluminum components; pre-assembled as a one-piece rigid frame in a factory so as to facilitate field mounting; easily and quickly mounts to the utility pole; provides safe and cost-effective installation; has exceptional strength per weight ratio when in place on the utility pole; provides a long-lasting and durable unit that will not fail or deteriorate under the expected forces of nature and time; and is otherwise well adapted for the purposes intended.

Briefly stated, the improved electrical equipment cluster mount of the present invention is constructed for use on a utility pole or the like. The cluster mount includes an elongated bearing plate adapted to be mounted to the utility pole; a hollow elongated and polygonally configured structural member having a plurality of interconnected sides and open ends, the hollow structure member being attached to the elongated bearing plate along one side thereof; and a plurality of individual bracket means mounted to the hollow structural member in predetermined spaced relationship to one another along the elongated sides thereof and also being structurally interlocked with at least one other adjacent bracket means on the hollow structural member for mounting electrical equipment in a predetermined clustered array on the utility pole.

Each of the individual bracket means includes supporting base means attached to the elongated sides of the hollow structural member, with the supporting base means of adjacent bracket means being structurally interlocked together. At least one of the bracket means is also interlocked relative to the elongated bearing plate. Fasteners, such as threaded industrial nuts and bolts, extend through the supporting base means of the bracket means, the hollow structural member and the elongated bearing plate. The structurally interlocked supporting base means of adjacent bracket means includes complementary interfitting and overlap supporting base portions.

The elongated bearing plate includes spaced distal supporting bases for overlapping and interlocking engagement relative to supporting base means of adjacent bracket means, with the fasteners extending through the spaced distal supporting bases of the bearing plate and supporting base means of adjacent bracket means, while also extending through the hollow structural member.

At least one of the bracket means is mounted on an elongated side of the hollow structural member, which is arranged in an opposed and parallel relationship to the elongated side of the hollow structural member that is attached to the elongated bearing plate. Spaced bracket means also extend generally outwardly from opposite open ends of the hollow structural member with each of the spaced bracket means having spaced supporting base means. One of such spaced supporting base means being in complementary interfitting and overlapping engagement to one of the distal supporting bases of the elongated bearing plate and the other of said spaced supporting base means being in complementary interfitting and overlapping engagement to the supporting base means of the bracket means mounted on the elongated side opposite from that side to which the elongated bearing plate is mounted.

Each of the bracket means includes a U-shaped bracket having spaced depending legs, each of which is attached to a supporting brace member, with each supporting brace member also having one of the supporting base means extending therefrom for attachment to the hollow structural member. Each of the spaced bracket means extending generally outwardly from the opposite open ends of the hollow structural member also including supporting brace members which are attached to each depending leg of the U-shaped bracket and are also structurally interconnected to and support one another.

The electrical equipment cluster mount includes cooperating and vertically aligned pairs of upper and lower bracket means each mounted to upper and lower hollow structural members attached to the elongated bearing plate, with the U-shaped brackets of each cooperating pair of upper and lower bracket means being inclined downwardly towards or upwardly away from one another to facilitate mounting of the electrical equipment thereto on different spacings. The upper and lower hollow structural members are also shiftable toward and away from one another along the elongated bearing plate for mounting the electrical equipment thereto at different spaced locations, and for accommodating equipment of varying sizes.

These and other objects and advantages of the present invention will become more apparent from the ensuing description.

BRIEF DESCRIPTION OF THE DRAWINGS

In the drawings.

Corresponding reference numerals will be used throughout the several figures in the drawings.

DESCRIPTION OF THE PREFERRED EMBODIMENTS

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

Figure 2:
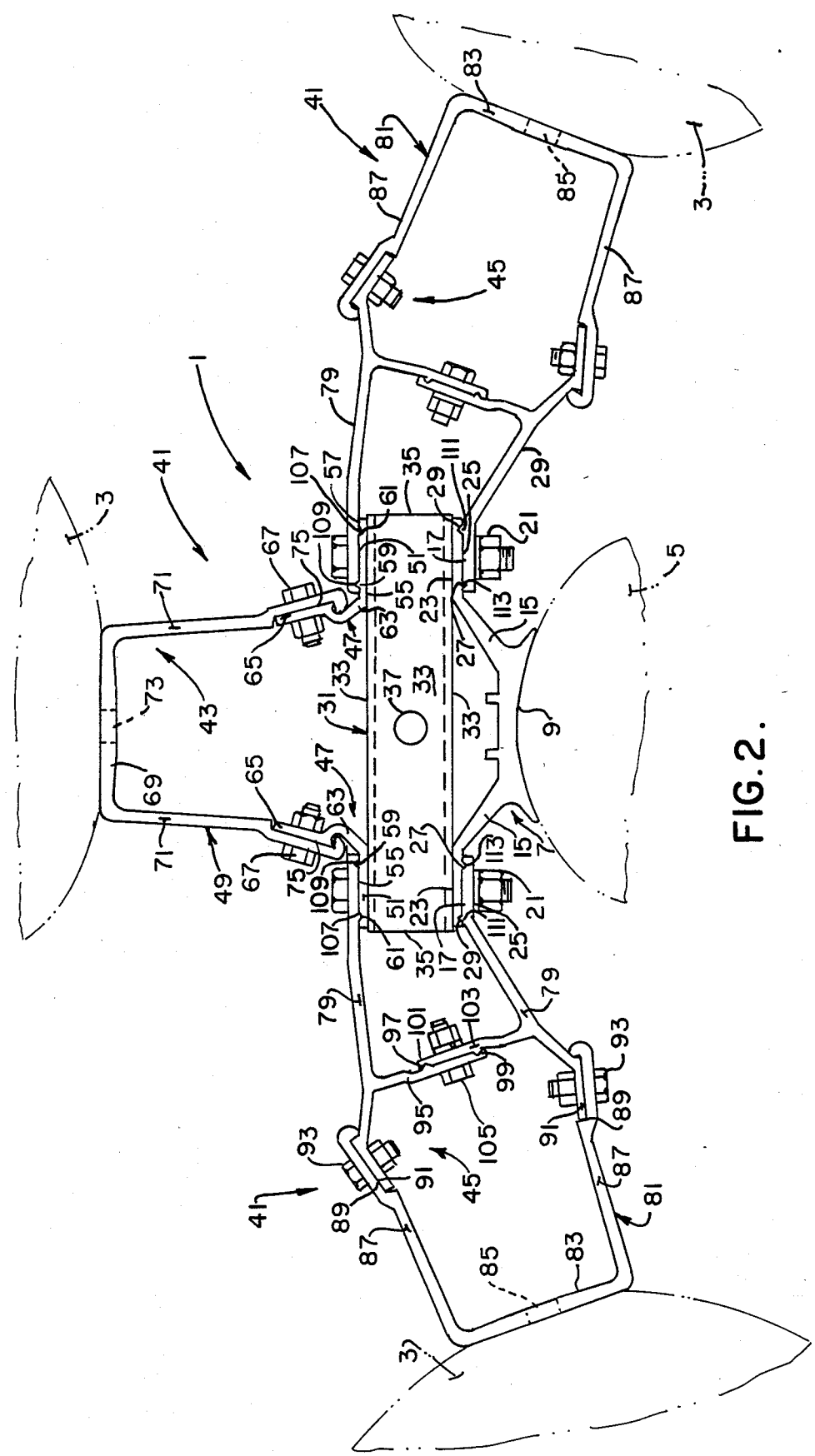
FIG. 2 is an enlarged top plan view specifically illustrating the interlocked and interconnected components of the improved electrical equipment cluster mount of the present invention.

The improved electrical equipment cluster mount 1 of the present invention is constructed to support a series of transformers 3 in circumferentially disposed array around an associated utility pole 5, as shown in FIG. 2. It is customary to mount cylindrically-shaped transformers 3 at the upper end of an elongated cylindrically shaped utility pole 5, and it is the electrical equipment cluster mount 1 of the present invention that makes this possible, in a way not made possible by prior art devices, as will become apparent.

As initially disclosed in our prior copending parent patent application, and as further disclosed in the improved constructions shown herein, it will be seen that the improved electrical equipment cluster mount 1 comprises a series of interlocking and interengaged extruded aluminum components which are constructed and arranged in a novel and unique manner.

The preferred type of aluminum alloy used for the components purpose is 6061-T6 aluminum alloy which, together with the pre-assembled, bolted interlocked and interengaged components, provides a unique construction or system with optimum environmental endurance. In addition, and as will become apparent below from the actual test results testing the strength and durability of the improved electrical equipment cluster mount 1, it will be seen that the improved electrical equipment cluster mount 1 of the present invention provides the best strength to weight ratio that is available today for supporting 100 kva through 167 kva transformer units or other equivalent electrical equipment.

The improved electrical equipment cluster mount 1 of the present invention includes an extruded elongated bearing plate 7 which has a curved or arcuate inner wall 9 that is complementary configured to the utility pole 5 for complementary mounting thereto. The elongated bearing plate 7 is mounted to the utility pole 5 through the use of a spaced longitudinal slot and keyhole opening 11, 13, shown only partially in FIG. 1 of the drawings, but disclosed and illustrated in our prior copending parent patent application. Suitably spaced fasteners (not shown) are driven or inserted into the utility pole 5 for complementary register and engagement with the longitudinal slot and keyhole openings 11, 13, respectively, in a manner well known.

Extending from an opposite side or wall of the arcuate or curved base 9 of the elongated bearing plates 7 are a pair of inclined or angularly outwardly extending wall sections 15, 15 which are integrally interconnected to generally horizontally extending distal or free end supporting bases 17, 17 at the free end of each of the inclined angularly offset wall section 15, 15. The spaced distal supporting bases 17, 17 of the elongated bearing plate 7 include through openings (not specifically shown) for receiving the threaded industrial bolt and complementary nut fastener 21, 21 therethrough, as will become apparent. Each spaced distal supporting base 7 has a flat or planar substantially horizontal outer surface 23 for mounting to a hollow structural member, as will become apparent, and an inner wall or surface 25 having a longitudinally extending inner rib 27 and longitudinally extending outer groove 29, for cooperative engagement with other components of the electrical equipment cluster mount 1, as will also become apparent.

Figure 1:
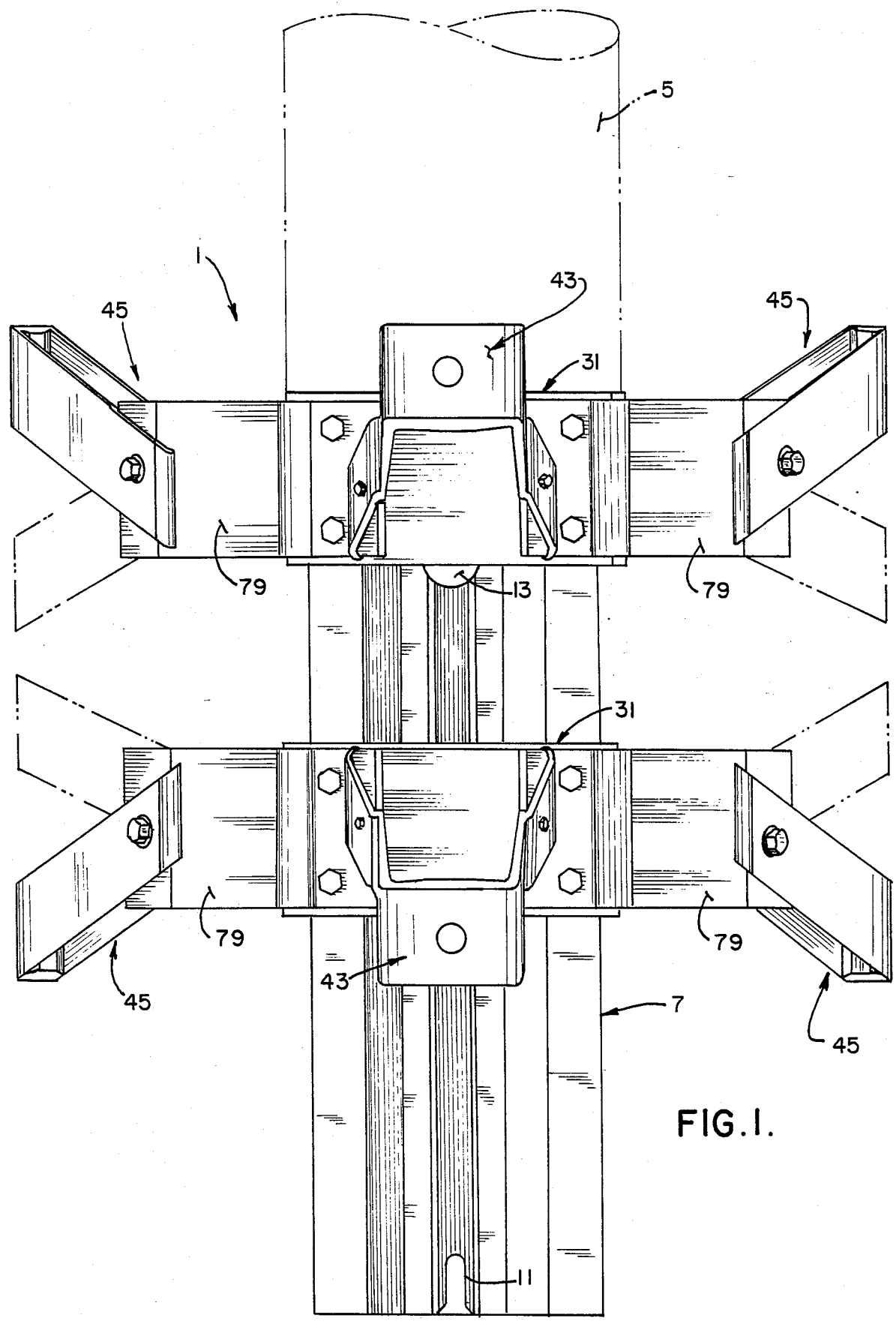
FIG. 1 is a front elevation view of the improved electrical equipment cluster mount constructed in accordance with the teachings of the present invention, and illustrating the manner in which associated spaced hollow structural members can be moved toward one another along the elongated bearing plate, and with the U-shaped brackets of cooperating vertically aligned pairs of brackets inclined downwardly towards or upwardly away from one another, as may be desired.

The elongated bearing plate 7 supports upper and lower hollow structural members 31, 31 which, together, with the other associated components, are identical in construction, and therefore it will be understood that a description of either the upper or lower hollow structural member 31, 31 and related components will apply equally to the other. Along the length of the elongated bearing plate 7, the upper and lower hollow structural member 31, 31 may be shifted toward and away from one another for attachment to the elongated bearing plate 7 at different spacings, for mounting the transformers thereto at different spaced locations, as may be desired. In FIG. 1 of the drawings, the upper and lower hollow structural members 31, 31 are positioned at the upper end of and along a median area of the elongated bearing plate 7, but it will be understood that the upper and lower hollow structural members 31, 31 may be mounted at opposite ends of the elongated bearing plate 7 or at other intermediate locations therebetween.

The hollow structural members or elements 31 are constructed in a manner similar to the corresponding component in our prior co-pending patent application in that each such member or element is elongated and polygonally configured to provide a plurality of elongated interconnected sides and open ends. Unlike the corresponding component in our prior copending patent application, the hollow structural members or elements 31 in the present application have a rectangular cross-section configuration rather than the trapezoidal-shaped cross sectional shaped configuration as in our prior co-pending patent application, for purposes to become apparent.

Each hollow structural member 31 serves as a cross arm or cross bar component in the improved electrical equipment cluster mount 1 of the present invention. Each such hollow structural member 31 is polygonally configured and includes a plurality of elongated interconnected sides 33 and generally transversely extending open ends 35, 35 at opposite ends of each hollow structural member 31. At least the upper hollow structural member 31 has an opening 37 to facilitate the insertion of a cable hook or the like for lifting the entire electrical equipment cluster mount into the desired position relative to the utility pole 5 for attachment thereto, as will be apparent.

As best seen in FIG. 2 of the drawings, the improved electrical equipment cluster mount 1 of the present invention is constructed to enable circumferentially spaced transformers 3 to be mounted in circumferential disposed array relative to the utility pole 5. For this purpose, a plurality of bracket assemblies 41, 41, 41 are mounted to each hollow structural member 31 in predetermined spaced relationship to one another along the elongated sides 33 thereof and also structurally interlocked with at least one other adjacent bracket assembly 41 along the elongated sides 33 of the hollow structural member for mounting the transformers 3 in a predetermined clustered array 3 relative to the utility pole 5. While each of the 3 bracket assemblies 41, 41, 41 are similar in their general overall structure and operation, they are somewhat differently constructed for mounting to the elongated sides 33 of the hollow structural member 31, and therefore, in order to distinguish them from one another, the bracket assembly which is mounted to the elongated side 33 generally opposite to and parallel to the elongated side 33 to which the elongated bearing plate 7 is mounted, will be referred to hereafter as the bracket assembly 43, whereas each bracket assembly that extends generally outwardly relative to the open ends 35 of the hollow structural member 31 will each be referred to hereafter as the oppositely extending bracket assemblies 45, 45, as shown in FIG. 2 of the drawing.

The bracket assembly 43 includes spaced supporting brace elements 47, 47 and U-shaped bracket 49. Each of the spaced supporting braces 47 includes a generally horizontally extending supporting base portion 51 having an opening (not shown) therethrough for receiving one of the threaded fasteners. The outer face or surface 55 of the supporting base 51 is generally flat or planar for face-to-face mounting relative to the hollow structural member 31, generally similar to the outer planar surfaces 23 of the distal supporting bases 17, 17 of the elongated bearing plate 7. The opposite or innerface 57 of each supporting base 51 includes an inner upstanding rib 59 and an outer groove or recess 61, for complementary interlocking engagement relative to the bracket arms of the other bracket assemblies 45, 45, as will become apparent. Extending upwardly and inwardly relative to the supporting bases 51, 51 are immediate inclined walls 63, 63 which are interconnected to inclined or angularly offset walls 65, 65 forming a complementary boss portion. Each of the inclined walls or boss portion 65 of the supporting bases 47 have openings therethrough (not shown) for receiving the threaded fasteners 67, in order to attach the U-shaped bracket 49 relative to the spaced supporting braces 47, 47.

The U-shaped bracket 49 includes a bight or end wall portion 69 and generally opposed depending legs 71, 71. The bight or end wall portion 69 of the U-shaped bracket 49 has an opening 73 therethrough for receiving a suitable threaded fastener (not shown) to facilitate mounting of one of the transformers 3 to the U-shaped bracket 49. Outer free ends of the depending legs 71, 71 of the U-shaped bracket 49 each include a complementary C-shaped recess 75, for complementary reception within the inclined walls or boss portion 65 of the spaced supporting braces 47. In this way, the U-shaped bracket 49 has a C-shaped recess 75 at the free ends of the legs 71, 71 for receiving complementary shaped boss portion 65, 65 of the supporting spaced races 47, 47 therein, which are interconnected thereto by the threaded fasteners 67, 67. In addition, the spaced supporting bases 51, 51 of supporting braces 47, 47 are attached to the hollow structural member 31 through the threaded fasteners 21, 21.

Each of the bracket assemblies 45, 45 are identical in construction, but are oppositely directed relative to the open free ends 35, 35 of the hollow structural member 31. Each of the bracket assemblies 45 includes a pair of spaced bracket arms 79, 79 and a U-shaped bracket 81.

Each U-shaped bracket 81 includes a bight or end wall portion 83 with an opening 85 therethrough for mounting to a transformer 3 by a fastening element or bracket (not shown) and depending legs 87, 87 having a C-shaped recess 89, 89 at the outer free ends thereof for complementary reception of a C-shaped boss 91, 91 at the outer free ends of each of the bracket arms 79, 79. Fasteners 93 extend through openings provided in each complementary C-shaped recess and boss 89, 91, respectively, for interlocked and interengaged assembly therewith.

Each of the bracket arms 79, 79 are structurally interconnected to and support each other by way of the transverse strut elements 95, 95 having complementary interfitting and overlapping portions including a spaced upstanding rib 97 and lower groove 99 on each upper bracket arm 79 (as viewed in FIG. 2) for complementary interfitting reception of an upper groove 101 and lower upstanding rib 103, respectively, on each lower bracket arm 79. When thus structurally interlocked and interfitted relative to one another, the transverse struts 95, 95 of each front and rear bracket arm 79, 79 can then be securely held together by the threaded nut and bolt fastener combination 105, as in the other fastener interlocking arrangements.

At the inner end of each front bracket arm 79, there is an inner upstanding rib 107 and outer groove 109 for complementary interfitting reception with the outer groove 61 and inner rib 59 on each supporting base 51 connected to the supporting brace of the bracket assembly 43.

In a similar manner, each rear bracket arm 79 has an inner upstanding rib 111 and an outer groove 113 for complementary interfitting reception with the outer groove and inner rib 29, 27, respectively, of each spaced distal supporting base 17 on the elongated bearing plate 7, for complementary interfitting and interlocked relationship thereto.

Each of the front and rear bracket arms 79, 79 are assembled as described above to the supporting bases 51, 51 associated with the bracket assemblies 43, 43 and the elongated bearing plate 7 through the use of the industrial nut and threaded bolt fastener elements 21, with all of the aforementioned elements attached to each other and to the hollow structural member 31 as illustrated in FIG. 2 of the drawings. In addition to the strong and durable high strength to weight ratio construction, as the result of the aforementioned interlocked and interengaged pre-assembled bolted components, the improved electrical equipment cluster mount 1 of the present invention provides versatility in mounting the transformers 3 in various predetermined positions relative to each other. Thus, by reversing the front and rear bracket arms 79, 79 in each of the bracket assemblies 45, 45, the transformers 3 instead of being mounted in a predetermined clustered array around the utility pole 5, can all be mounted on one side of the utility pole 5, as is required in certain state regulations. Also, as illustrated in FIG. 1 of the drawings, cooperating vertically aligned pairs of upper and lower U-shaped brackets 81, 81, as well as the cooperating pairs of vertically aligned upper and lower brackets 49, 49, which are mounted to upper and lower hollow structural members 31, 31, may be inclined generally towards or away from one another as shown in the dotted to full line illustration in FIG. 1 of the drawings, to facilitate mounting of the different sized transformers 3 on different spacings. Also, as has been previously explained, the upper and lower hollow structural members 31 may be axially shifted towards or away from one another, either in the close upper and median position illustrated in FIG. 1 or in upper and lower positions at each end of the elongated bearing plate 7, or in any other intermediate position that may be desired. Thus, it will be seen that there is suitable flexibility and versatility in mounting transformers 3 in different circumferentially disposed arrays relative to the utility pole and in different mounted spacings relative to each other, as a result of the positions of the brackets or different locations of the hollow structural members 31, 31 on the elongated bearing plate 7.

In order to verify and establish the load bearing capability of the improved electrical equipment cluster mount 1 of the present invention, tests were performed on sample units bolted to a 10 inch steel test pole in a simulated field installation. In the particular test conducted, the brackets were directed away from one another, while being spaced approximately 29 inches apart from one another, and with the hollow structural members mounted at the upper and lower ends of the elongated bearing plate, to also establish the 29 inch spacing. To simulate transformer loading, a special adapter plate was mounted 18 inches from the outer mounting surfaces of the brackets, at each of the 3 connected transformer locations. Loads were applied to the three positions in 500 pound increments and the loads were measured by strain gage load cells mounted in series with hydraulic cylinders, so as to determine the deflection in inches at each mounting location. Due to the unique construction, arrangement, interlocking and interengagement of the components in the improved electrical equipment cluster mount 1 of the present invention, failure did not occur until an ultimate load of 6,340 pounds was reached, and yielding actually occurred in the area around one of the threaded fasteners. This is a very substantial improvement over the prior art, including the specific construction illustrated in our aforementioned prior copending patent application, and is attributable to the structurally interlocked and interengaged arrangement of the brackets mounted and secured along the elongated sides of the hollow structural member, with the adjacent brackets within the cluster being structurally interlocked together, all as described above.

In view of the above, it will be seen that the several objects and features of this invention are achieved and advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. An electrical equipment cluster mount for use upon a utility pole or the like comprising:
   an elongated bearing plate adapted to be mounted to the utility pole;
   an elongated and polygonally configured structural member having a plurality of elongated interconnected sides and open ends, said structural member being attached to said elongated bearing plate along one side thereof; and
   a plurality of individual bracket means mounted to said structural member in predetermined spaced relationship to one another along the elongated sides thereof and also being structurally interlocked with at least one other adjacent bracket means on said structural member for mounting electrical equipment in a predetermined clustered array relative to said utility pole.

2. The electrical equipment cluster mount as defined in claim 1 and wherein said structure member being hollow.

3. The electrical equipment cluster mount as defined in claim 2 wherein each of said bracket means includes supporting base means attached to the elongated sides of said hollow structural member, the supporting base means of adjacent bracket means being structurally interlocked together.

4. The electrical equipment cluster mount as defined in claim 3 wherein at least one of said bracket means is also interlocked relative to said elongated bearing plate.

5. The electrical equipment cluster mount as defined in claim 4 including fasteners extending through the supporting base means of said bracket means, the hollow structural member, and said elongated bearing plate.

6. The electrical equipment cluster mount as defined in claim 5 wherein the structurally interlocked supporting base means of adjacent bracket means includes complementary interfitting and overlapping supporting base portions.

7. The electrical equipment cluster mount as defined in claim 6 wherein the elongated bearing plate includes spaced distal supporting bases for overlapping and interlocking engagement relative to supporting base means of adjacent bracket means, said fasteners extending through the spaced distal supporting bases of said bearing plate and supporting base means of adjacent bracket means while also extending through said hollow structural member.

8. The electrical equipment cluster mount as defined in claim 7 wherein at least one of said bracket means is mounted on an elongated side of said hollow structural member which is in opposed and parallel relationship to the elongated side of said hollow structural member that is attached to said elongated bearing plate.

9. The electrical equipment cluster mount as defined in claim 8 wherein there are spaced bracket means which extend generally outwardly from opposite open ends of said hollow structural member, each of said spaced bracket means having spaced supporting base means with one of said spaced supporting base means being in complementary interfitting and overlapping engagement to one of the distal supporting bases of said elongated bearing plate and the other of said spaced supporting base means of said bracket means mounted to the generally opposed and parallel elongated side of said hollow structural member opposite from said elongated bearing plate.

10. The electrical equipment cluster mount as define in claim 9 wherein each of said bracket means includes a U-shaped bracket having spaced depending legs each attached to a supporting brace member, each supporting brace member having one of said supporting base means extending therefrom for attachment to said hollow structural member.

11. The electrical equipment cluster mount as defined in claim 10 wherein each of the spaced bracket means which extend generally outwardly from the opposite open ends of said hollow structural member include supporting brace members which are attached to each depending leg of the U-shaped bracket and also structurally interconnect and support one another.

12. The electrical equipment cluster mount as defined in claim 11 and including cooperating and vertically aligned pairs of front and rear bracket means each mounted to upper and lower hollow structural members attached to said elongated bearing plate, the U-shaped brackets of each cooperating pair of front and rear bracket means being inclined downwardly towards or upwardly away from one another to facilitate mounting of said electrical equipment thereto on different spacings.

13. The electrical equipment cluster mount as defined in claim 12 wherein the upper and lower hollow structural members are also shiftable toward and away from one another for attachment to said elongated bearing plate at different spacings for mounting said electrical equipment thereto at different spaced locations.

* * * * *